United States Patent [19]

Grundken et al.

[11] Patent Number: 4,646,905
[45] Date of Patent: Mar. 3, 1987

[54] RETAINING ELEMENT

[75] Inventors: Dieter Grundken, Lunen; Manfred Redder, Bergkamen-Oberaden, both of Fed. Rep. of Germany

[73] Assignee: Gewerkschaft Eisenhutte Westfalia, Lunen, Fed. Rep. of Germany

[21] Appl. No.: 320,915

[22] Filed: Nov. 12, 1981

[30] Foreign Application Priority Data

Nov. 12, 1980 [DE] Fed. Rep. of Germany ....... 3042537

[51] Int. Cl.$^4$ ............................................. B65G 19/28
[52] U.S. Cl. ................................. 198/735; 198/860.2; 403/326
[58] Field of Search ............ 198/860, 861, 735, 860.2, 198/861.2; 403/326

[56] References Cited

U.S. PATENT DOCUMENTS 4,157,751  6/1979  Grundken et al. ................... 198/735
4,479,575  10/1984  Grundken et al. ................... 198/735

FOREIGN PATENT DOCUMENTS 2754570  6/1979  Fed. Rep. of Germany ...... 198/735
2826023  12/1979  Fed. Rep. of Germany ...... 198/735

Primary Examiner—Robert J. Spar
Assistant Examiner—Jonathan D. Holmes
Attorney, Agent, or Firm—Sughrue, Mion, Zinn, Macpeak and Seas

[57] ABSTRACT

Connection means for connecting two components such as conveyor channel sections or guide sections includes an elongate connector. The connector is insertible into laterally-open recesses formed in coupling elements attached to the two components. The laterally-open recesses define an elongate aperture which is slightly longer than the connector so that the connector is received within the aperture with a predetermined amount of axial play. A retaining element prevents axial movement of the connector within the aperture by filling up the space available for said predetermined amount of axial play. The retaining element is an annular disc made of corrosion-resistant, resiliently deformable plastics material. That portion of the resilient element which, in use, is positioned at the mouth of the aperture is, at least partially, of reduced wall thickness when compared with the wall thickness of the remaining part of the retaining element. This permits the retaining element to be deformed as it is positioned within said space.

23 Claims, 5 Drawing Figures

RETAINING ELEMENT

BACKGROUND TO THE INVENTION

This invention relates to connection means for connecting adjacent channel sections of a scraper-chain conveyor or adjacent sections of a winning machine guide, and to a retaining element for such connection means.

A variety of devices for connecting the individual channel sections of scraper-chain conveyors are known. Such devices normally resist tensile forces which tend to draw the ends of the channel sections apart, and allow some angular mobility between the channel section ends. The connection devices are often subjected to very high forces during operation, not only the tensile forces which they are designed to resist but also buckling forces tending to displace the conveyor ends laterally and/or vertically. Primarily, the lateral forces occur when the conveyor is shifting up to follow the mineral winning progress. This is usually accomplished by means of rams which shift individual lengths of the conveyor in the so-called "snaking" movement. The vertical forces usually occur when a mining machine supported on the conveyor is moved, for example, along the mineral face. Where the floor of the mine working is uneven, these lateral and vertical forces can increase substantially.

One known form of device for connecting the individual channel sections of a scraper-chain conveyor is constituted by a coupling member in the form of a shank provided at each end with an enlarged head portion. The coupling member is introduced into aligned apertures in coupling elements which are welded onto the channel section ends. The coupling member is received within the aligned apertures with a predetermined amount of axial play. One head portion of the coupling member is provided with an axially-extending fastening member which engages behind a complementary fastening member provided on one of the channel sections. The other head portion of the coupling member is provided with a pair of shoulders which cooperate with complementary recesses provided in the coupling element of the other channel section. The coupling member can be introduced into the apertures obliquely from the side, and is prevented from falling out laterally by the fastening member and the shoulders engaging respectively with said complementary fastening member and said complementary recesses. A retaining element in the form of a metallic C-shaped clip is positioned adjacent to said other head portion of the coupling member to prevent axial movement of the coupling member by filling up the space available for said predetermined amount of axial play. Thus, the coupling member cannot move along the aligned apertures so that its fastening member and shoulders move out of engagement with their respective complementary fasteners. The coupling member is, therefore, safely held in position under all normal load conditions, particularly under the loads imposed by angling of the channel sections. (See DE-OS 2 636 527).

Unfortunately, it has been found that resilient clips of this type are subjected to considerable forces in the course of underground mining operations, and these forces may lead to the permanent deformation and damage of the clips. Such damaging forces can arise, for example, when coal dust collects in the pockets that accommodate the clips, the dust becoming relatively firmly briquetted in the pockets, so that the inherent limited degree of play within the pockets is reduced. Moreover, during underground operations, the resilient clips suffer quite considerable corrosion, which affects their operational efficiency, and hence reduces the reliability of the connection means.

Connection means of this type are also used for connecting the sections of a winning machine guide (for example a plough guide) which is built onto the channel sections of a scraper-chain conveyor.

Instead of metallic resilient clips, it is also known to use clips made of a resilient material such as rubber, and to surround this material with a wear-resistant jacket. The resilient material has a rigid filler embedded therein to form a resilient, but firm, core. Unfortunately, retaining elements of this type are relatively costly to manufacture, and are also subject to corrosion when use is made of a metallic jacket. (See DE-OS 2 826 023).

The aim of the invention is to provide a retaining element for connection means of the type described above, the retaining element being easy and inexpensive to manufacture, whilst having greater operational reliability.

SUMMARY OF THE INVENTION

The present invention provides connection means for connecting two components of a mineral mining installation, the connection means comprising an elongate member which is insertible into laterally-open recesses formed in the two components, the laterally-open recesses defining an elongate aperture which is slightly longer than the coupling member so that the coupling member is received within the aperture with a predetermined amount of axial play, a retaining element being provided for preventing axial movement of the coupling member within the aperture by filling up the space available for said predetermined amount of axial play, wherein the retaining element is an annular disc made of corrosion-resistant, resiliently deformable material, and wherein that portion of the retaining element which, in use, is positioned at the mouth of the aperture is, at least partially, of reduced wall thickness when compared with the wall thickness of the remaining part of the retaining element.

Advantageously, the retaining element is made of plastics material. Thus, retaining elements of this type can be manufactured as inexpensive, mass-produced articles by cutting up tubular extrusions. Moreover, because they are cheap, they can be used as simple throwaway parts, so they can be broken open (for example with a chisel) prior to being removed so as to allow the connection means to be released. When broken up, such a retaining element can easily be withdrawn, for example using a pair of pliers.

Preferably, the retaining element is made of high-strength low-pressure polyethelene. Particularly suitable for this purpose is a retaining element made of high-strength low-pressure polyethelene having a high degree of polymerisation and a molecular weight within the range of from 3.5 millions to 4 millions. This material is distinguished by its high mechanical strength, its high resistance to wear, as well as its unlimited resistance to corrosion and its self-lubricating properties. Even though it is relatively hard, this material possesses sufficient resilience to enable the retaining element to deform sufficiently to permit it to be positioned in the aperture. Because of its good lubricating properties, any small projecting corners of the retaining element can easily be overiden by, for example, a mineral winning plough.

Advantageously, the retaining element is provided with two rounded thickened wall portions which are positioned symmetrically at opposite ends of said portion of the retaining element. Conveniently, said rounded thickened wall portion extremities are spaced apart by a distance which is slightly greater than the distance between two latching projections provided within the aperture. Thus, in order to position the retaining element within the aperture, it is necessary to deform the retaining element as it is forced past the latching projections. The reduction in wall thickness of said portion of the retaining element facilitates this deformation. Once in position, the rounded thickened wall portions bear resiliently against the latching projections to hold the retaining element firmly in position.

Said portion of the retaining element may be of rectilinear formation and be formed with a substantially planar outer face. The retaining element can be forced into position in the aperture by means of hammer blows on said planar outer face. Advantageously, said portion of the retaining element is provided with a pair of parallel, grippable lateral faces. Preferably, the lateral faces are positioned in the zones where said rectilinear portion merges with the rounded thickened wall portions, and lie substantially at right-angles to said planar outer face. These lateral faces can easily be gripped by a pair of pliers to remove the retaining element once it has been broken open.

Advantageously, said portion of the retaining element is provided with a notch whose mouth lies on the outer periphery of the retaining element. Preferably, the notch is positioned adjacent to one of the rounded thickened wall portions of said portion of the retaining element. The notch facilitates the breaking open of the retaining element, for example by means of a chisel.

In one preferred embodiment, said portion of the retaining element is provided with a pair of notches whose mouths lie on the outer periphery of the retaining element, each of the notches being positioned adjacent to a respective one of the rounded thickened wall portions of said portion of the retaining element. One of these notches is used as a start for breaking open the retaining element, the other notch forming a bending point about which said portion can be forced into the interior of the retaining element. This facilitates the subsequent removal of the retaining element from the aperture.

Alternatively, said portion of the retaining element is provided with an internal notch whose mouth lies on the inner periphery of the retaining element. In this case, said portion only has one external notch, and the internal notch is positioned adjacent to one of the rounded thickened wall portions, and the said notch is positioned adjacent to the other rounded thickened wall portion. In this case, the external notch is used as a start for breaking open the retaining element, and the internal notch is used as a bending point. Preferably, the internal notch is of part-circular cross-section.

Advantageously, the retaining element has a circular inner periphery. Preferably, the retaining element is provided with a further rounded thickened wall portion which is positioned at the opposite side of the retaining element to said portion and is, in use, supported by the base of the aperture. Where the connection means is used to connect the channel sections of a scraper-chain conveyor, the coupling member and the retaining element are housed within the V-shaped portion of the channel section side walls. Preferably, therefore, the outer periphery of the retaining element has approximately the shape of an isosceles triangle having rounded corners. In this case, the rounded corners of the triangle constitute the rounded thickened wall portions of the retaining element.

Conveniently, the retaining element is formed by cutting a flat annular disc from a tubular extrusion.

The invention also provides connection means for connecting two channel sections of a scraper-chain conveyor, the connection means being as defined above, and the two components being coupling elements welded to the adjacent side walls of the two channel sections.

The invention further provides a retaining element for an elongate member which is insertible into laterally-open recesses formed in two mineral mining installation components to interconnect said components, the laterally-open recesses defining an elongate aperture which is slighty longer than the coupling member so that the coupling member is received within the aperture with a predetermined amount of axial play, the retaining element being such as to prevent axial movement of the coupling member within the aperture by filling up the space available for said predetermined amount of axial play, wherein the retaining element is an annular disc made of corrosion-resistant, resiliently deformable material, and wherein that portion of the retaining element which, in use, is positioned at the mouth of the aperture is, at least partially, of reduced wall thickness when compared with the wall thickness of the remaining part of the retaining element.

BRIEF DESCRIPTION OF THE DRAWINGS

The invention will now be described in greater detail, by way of example, with reference to the accompanying drawings, in which.

DESCRIPTION OF PREFERRED EMBODIMENTS

Figure 1:
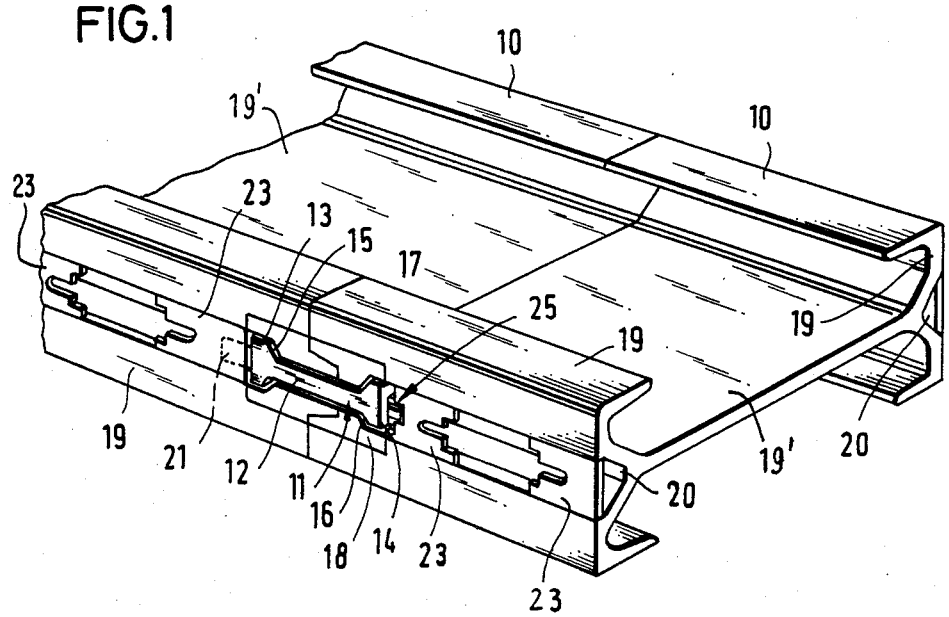
FIG. 1 is a diagrammatic perspective view of the adjacent end portions of two channel sections of a scraper-chain conveyor connected together by connection means incorporating retaining elements constructed in accordance with the invention.

In known manner, a scraper-chain conveyor is constituted by a plurality of channel sections (or pans) arranged end-to-end. FIG. 1 shows the adjoining parts of two such channel sections 10, each of which is constituted by side walls 19 having a generally sigma-shaped cross-section and a floor plate 19' welded between the V-shaped, recessed central portions 20 of the side walls. The adjacent ends of each pair of adjacent side walls 19 of the two channel sections 10 are connected together by respective connection means (only one of which can be seen in the drawings). Each of these connection means is the same, so only one of them will be described in detail.

Each connection means includes a coupling member 11 and a pair of coupling elements 17 and 18, the coupling elements being welded to the adjacent ends of the side walls 19 within the V-shaped portions 20. The coupling element 17 is formed with a projection which mates, with an all-round clearance, with a recess in the coupling element 18. This ensures that the two channel sections 10 have the required angular mobility. Each of the coupling elements 17 and 18 is formed with a respective laterally-open recess 15 and 16 whose combined outline is adapted to the outer contour of the coupling member 11.

Figure 2:
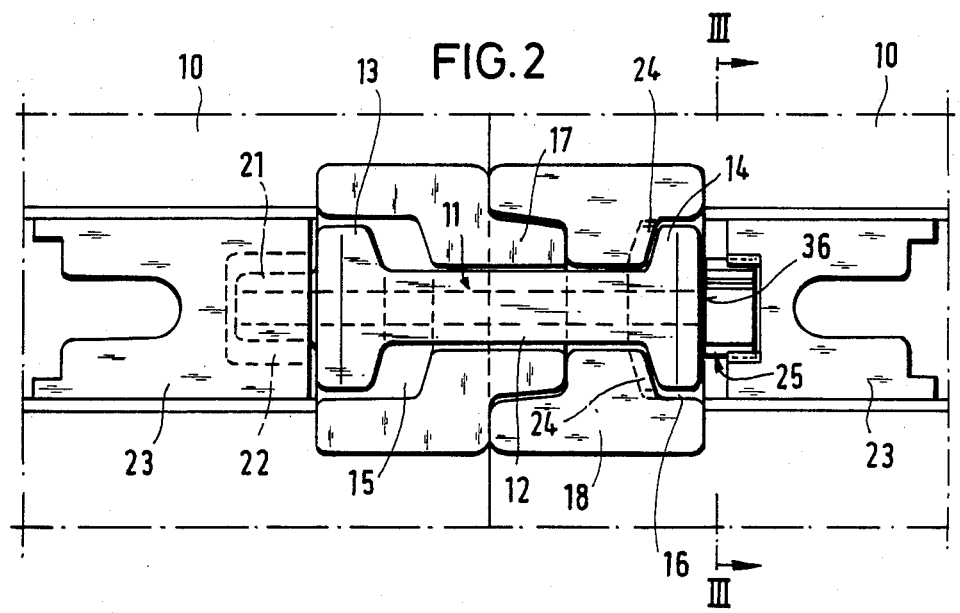
FIG. 2 is a side elevation of the connection means of FIG. 1.

The coupling member 11, which is made as a one-piece casting or forging, comprises a shank 12 provided, at each end thereof, with an enlarged head portion 13 and 14. The coupling member 11 can be inserted into the recesses 15 and 16 to connect the coupling elements 17 and 18 together. An axially-extending fastening member 21 is provided on the head portion 13 of the coupling member 11, the fastening member 21 engaging, in the coupled position, within a recess 22 formed within a holder 23 welded into the V-shaped portion 20 in the left-hand side wall 19 (as seen in FIGS. 1 and 2). A pair of latching recesses 24 are formed on the head portion 14 of the coupling member 11, the latching recesses being formed in the region where the head portion 14 merges with the shank 12. The latching recesses 24 have an axial dimension which is smaller than that of the fastening member 21. In the coupled position, the latching recesses 24 engage behind complementary shoulders (not shown) formed on the rear surface of the coupling element 18. A holder 23 is also welded into the V-shaped portion 20 in the side wall 19 of the right-hand channel section 10 (as seen in FIGS. 1 and 2).

The connection between the two channel sections 10 is effected in such a manner that the projections on the coupling elements 17 extend into the complementary recesses in the coupling elements 18. Each of the coupling members 11 is subsequently inserted into the respective recesses 15 and 16 obliquely from the side in such a manner that its fastening member 21 engages behind the holder 23 of the left-hand channel section 10 (as seen in FIGS. 1 and 2). Then, by axially displacing the coupling member 11 within the recesses 15 and 16, it is possible to effect positive fastening of the coupling member against the other coupling element 18, the recesses 24 mating with the complementary shoulders on that coupling element. The coupling member 11 is thus prevented from falling sideways out of the recesses 15 and 16.

In order to maintain the coupled condition of the channel sections 10, and to retain the coupling members 11 axially in the coupled position, each of the connection means is provided with a retaining element 25 which is inserted into the V-shaped portion 20 of the side wall 19 of the right-hand channel section 10 (as seen in FIGS. 1 and 2). The retaining elements 25 form stops for the head portions 14 of the coupling members 11, which are thereby prevented from moving axially within the recesses 15 and 16. Each of the retaining elements 25 is positioned between the respective head portion 14 and the respective holder 23.

Figure 3:
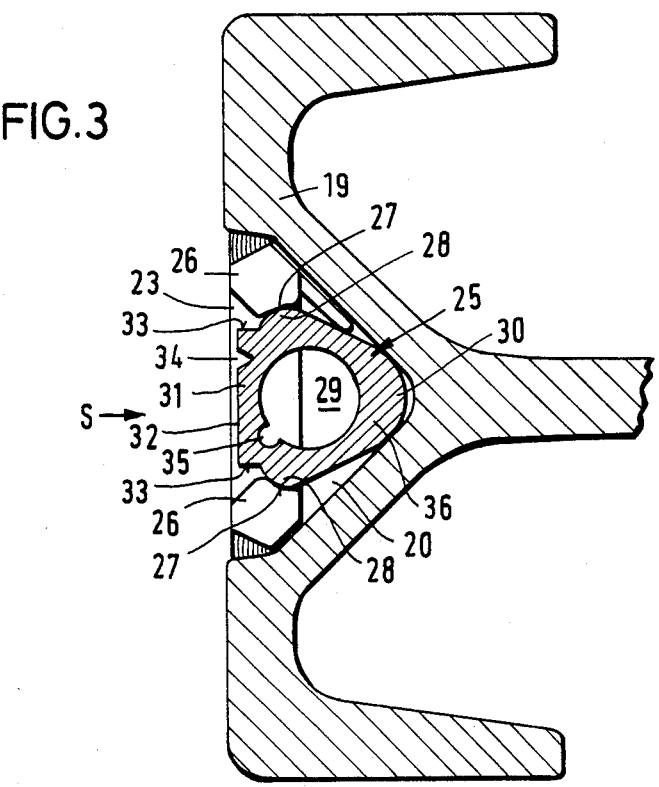
FIG. 3 is a cross-section taken on the line III—III of FIG. 2.

FIG. 3 shows how a retaining element 25 is seated within the pocket defined by the V-shaped portion 20 of the side wall 19 and the adjacent holder 23. The open side of this pocket is delimited, at the top and the bottom, by respective latching projections 26 provided on the holder 23. Each of the latching projections 26 has a rounded latching and support face 27, against which bear rounded, thickened wall portions 28 of the retaining element 25.

Figure 4:
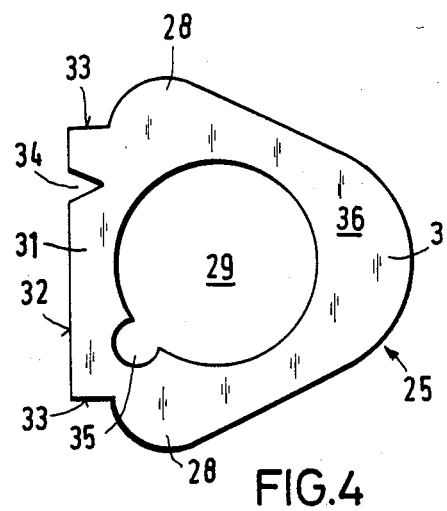
FIG. 4 is a side elevation of a first form of retaining element.

FIG. 4 shows the configuration of a retaining element 25 in greater detail. Thus, each retaining element 25 is of annular disc form, having a generally circular internal aperture 29, and an outer periphery which corresponds generally to that of an isosceles triangle, the corners of which are rounded and shaped to form thickened wall portions. The two outer thickened portions are the rounded, thickened wall portions 28 referred to above, and the inner thickened portion 30 is arranged to support the retaining element 25 against the base of the V-shaped portion 20 of the associated side wall 19 (see FIG. 3). Thus, the thickness of the walls of the retaining element 25 is greatest at its corners, the intermediate wall portions (the sides of the triangle) being considerably thinner.

The peripheral portion of the retaining element 25 that is disposed at the mouth of the pocket is formed as a web portion 31 having a generally planar outer face 32. In the regions where the web portion 31 merges with the thickened wall portions 28, shoulders 33 are provided, the shoulders 33 extending at right-angles to the planar face 32. In use, the shoulders 33 provide suitable faces which can be gripped by, for example, a pair of pliers. A V-shaped notch 34 is machined in the web portion 31, the V-shaped notch being positioned adjacent to the shoulder 33 at one end of the web portion. Adjacent to its other end, a part-circular notch 35 is machined in the web portion 31, the notch 35 opening out into the internal aperture 29 of the retaining element 25. The notch 35 substantially reduces the wall thickness of the web portion 31.

Once a given coupling member 11 has been positioned in its coupled position, the associated retaining element 25 is introduced from the side (that is to say in the direction of the arrow S shown in FIG. 3) into the pocket defined by the V-shaped portion 20 of the respective side wall 19, the adjacent holder 23, and the adjacent end face of the coupling member head portion 14. This is done by forcing the retaining element 25 into place by hammer blows applied to its face 32. The retaining element 25 deforms resiliently as it is forced past the latching projections 26 which are spaced apart by a distance which is slightly less than that between the ends of the wall portions 28. When in position, therefore, the wall portions 28 of the retaining element 25 bear resiliently against the latching and support faces 27 of the latching projections 26, and the inner thickened portion 30 bears against the base of the V-shaped portion 20 of the side wall 19. Thus, the retaining element 25 is securely seated within its pocket as a result of its resilience. The side face 36 of the retaining element 25 that faces the coupling member 11 forms a stop face for the head portion 14. The retaining element 25 thus prevents axial displacement of the coupling member 11, and hence accidental release of the connection means.

In order to release the connection means, it is first necessary to remove the retaining element 25. This is done by cutting through the web portion 31 at the notch 34, for example by means of a chisel inserted into the notch from the side. The divided web portion 31 can then be pressed into the internal aperture 29, this being facilitated by the reduced wall thickness caused by the notch 35. The retaining element 25 can then be removed from its pocket by gripping the shoulders 33 with a pair of pliers, and by pulling the pliers away from the pocket (that is to say in the direction opposite to that of the arrow S shown in FIG. 3).

Figure 5:
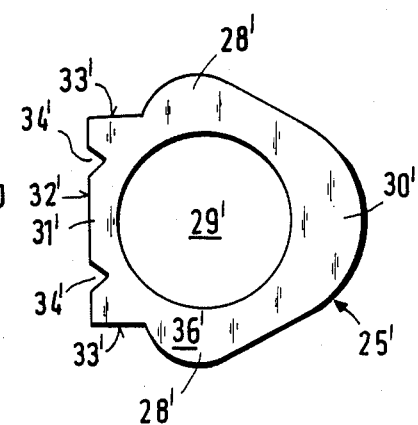
FIG. 5 is a side elevation of a second form of retaining element.

FIG. 5 shows a modified form of retaining element 25'. The retaining element 25' is similar to the retaining element 25, and so like parts have been given like (but primed) reference numerals. The only difference between the two forms of retaining element is that the element 25' has a pair of V-shaped notches 34' in place of the single V-shaped notch 34 and the single part-circular notch 35 of the element 25. The two notches 34' are symmetrically positioned along the web portion 31' of the retaining element 25', and adjacent to the shoulders 33'. In order to release the retaining element 25', its web portion 31' is cut through at one of the notches 34'. The web portion 31' can then be pushed into the internal aperture 29', this being facilitated by the reduced wall thickness caused by the other notch 34'; and the retaining element 25' can subsequently be removed using a pair of pliers.

The retaining elements are made of a high-strength, corrosion-resistant material, preferably a plastics material. Particularly suitable for this purpose is a plastics material known as "Werkstoff S". This is a low-pressure polyethylene having a high degree of polymerisation, and a molecular weight which is approximately 3.5 to 4 millions (as measured by the light-scatter method). This material is usually shaped by fusion sintering of the powder in presses using high pressures. Preferably, the retaining elements are produced by cutting up a tubular extrusion. Conveniently, the extrusion is produced by an injection moulding machine provided with a suitably shaped die.

We claim:

1. In connection means for connecting two channel sections of a scraper-chain conveyor, the connection means comprising an elongate member which is insertible into laterally-open recesses formed in two coupling elements welded to adjacent side walls of the channel sections, the laterally-open recesses defining an elongate aperture which is slightly longer than the coupling member so that the coupling member is received within the aperture with a predetermined amount of axial play, a retaining element being provided for substantially preventing axial movement of the coupling member within the aperture by substantially filling up the space available for said predetermined amount of axial play, the improvements comprising forming the retaining element as an annular disc made of corrosion-resistant, resiliently deformable material, said disc having an unbroken peripheral wall completely surrounding an internal aperture, and forming at least part of that portion of the retaining element which is positioned at the mouth of the aperture of reduced wall thickness when compared with the wall thickness of the remaining part of the retaining element, wherein the retaining element is provided with two rounded thickened wall portions which are positioned symmetrically at opposite ends of said portion of the retaining element, and wherein said portion of the retaining element is provided with at least one notch whose mouth lies on the outer periphery of the retaining element.

2. A retaining element according to claim 1, wherein the retaining element is made of plastics material.

3. A retaining element according to claim 2, wherein the retaining element is made of high-strength low-pressure polyethelene.

4. A retaining element according to claim 3, wherein the retaining element is made of high-strength low-pressure polyethelene having a high degree of polymerisation and a molecular weight within the range of from 3.5 millions to 4 millions.

5. A retaining element according to claim 1, wherein said rounded thickened wall portion extremities are spaced apart by a distance which is slightly greater than the distance between two latching projections provided within the aperture.

6. A retaining element according to claim 1, wherein said portion of the retaining element is of substantially rectilinear formation and is formed with a substantially planar outer face.

7. A retaining element according to claim 6, wherein said portion of the retaining element is provided with a pair of parallel, grippable lateral faces.

8. A retaining element according to claim 7, wherein the lateral faces are positioned in the zones where said rectilinear portion merges with the rounded thickened wall portions, and lie substantially at right-angles to said planar outer face.

9. A retaining element according to claim 1, wherein the notch is positioned adjacent to one of the rounded thickened wall portions of said portion of the retaining element.

10. A retaining element according to claim 9, wherein said portion of the retaining element is provided with an internal notch whose mouth lies on the inner periphery of the retaining element.

11. A retaining element according to claim 10, wherein the internal notch is positioned adjacent to one of the rounded thickened wall portions, and the said notch is positioned adjacent to the other rounded thickened wall portion.

12. A retaining element according to claim 10, wherein the internal notch is of part-circular cross-section.

13. A retaining element according to claim 1, wherein said portion of the retaining element is provided with a pair of notches whose mouths lie on the outer periphery of the retaining element.

14. A retaining element according to claim 13, wherein each of the notches is positioned adjacent to a respective one of the rounded thickened wall portions of said portion of the retaining element.

15. A retaining element according to claim 1, wherein the retaining element has a circular inner periphery.

16. A retaining element according to claim 1 wherein the retaining element is provided with a further rounded thickened wall portion which is positioned at the opposite side of the retaining element to said portion and is supported by the base of the aperture.

17. A retaining element according to claim 16, wherein the outer periphery of the retaining element has approximately the shape of an isosceles triangle having rounded corners.

18. A retaining element according to claim 17, wherein the rounded corners of the triangle constitute the rounded thickened wall portions of the retaining element.

19. A retaining element according to claim 1, wherein the retaining element is formed by cutting a flat annular disc from a tubular extrusion.

20. A retaining element for an elongate member which is insertible into laterally-open recesses formed in two mineral mining installation components to interconnect said components, the laterally-open recesses defining an elongate aperture which is slightly longer than the coupling member so that the coupling member is received within the aperture with a predetermined amount of axial play, the retaining element being such as to prevent substantial axial movement of the coupling member within the aperture by substantially filling up the space available for said predetermined amount of axial play, wherein the retaining element is an annular disc made of corrosion-resistant, resiliently-deformable material, said disc having an unbroken peripheral wall completely surrounding an internal aperture, and wherein that portion of the retaining element which is positioned at the mouth of the aperture is, at least partially, of reduced wall thickness when compared with the wall thickness of the remaining part of the retaining element, wherein the retaining element is provided with two rounded thickened wall portions which are positioned symmetrically at opposite ends of said portion of the retaining element, and wherein said portion of the retaining element is provided with at least one notch whose mouth lies on the outer periphery of the retaining element.

21. Connection means for connecting two channel sections of a scraper-chain conveyor, the connection means comprising an elongate member which is insertible into laterally-open recesses formed in two coupling elements fixed to adjacent side walls of the channel sections, the laterally-open recesses defining an elongate aperture which is sightly longer than the coupling member so that the coupling member is received within the aperture with a predetermined amount of axial play, a retaining element being provided for substantially preventing axial movement of the coupling member within the aperture by substantially filling up the space available for said predetermined amount of axial play, wherein the retaining element is an annular disc made of corrosion-resistant, resiliently deformable material, said disc having an unbroken peripheral wall completely surrounding an internal aperture, and wherein that portion of the retaining element which is positioned at the mouth of the aperture is, at least partially, of reduced wall thickness when compared with the wall thickness of the remaining part of the retaining element, wherein the retaining element is provided with two rounded thickened wall portions which are positioned symmetrically at opposite ends of said portion of the retaining element, and wherein said portion of the retaining element is provided with at least one notch whose mouth lies on the outer periphery of the retaining element.

22. Connection means for connecting two components of a mineral mining installation, the connection means comprising an elongate member which is insertible into laterally-open recesses formed in two coupling elements fixed to adjacent side walls of said components, the laterally-open recesses defining an elongate aperture which is slightly longer than the coupling member so that the coupling member is received within the aperture with a predetermined amount of axial play, a retaining element being provided for substantially preventing axial movement of the coupling member within the aperture by substantially filling up the space available for said predetermined amount of axial play, wherein the retaining element is an annular disc made of corrosion-resistant, resiliently deformable material, said disc having an unbroken peripheral wall completely surrounding an internal aperture, and wherein that the portion of the retaining element which is positioned at the mouth of the aperture is, at least partially, of reduced wall thickness when compared with the wall thickness of the remaining part of the retaining element, wherein the retaining element is provided with two rounded thickened wall portions which are positioned symmetrically at opposite ends of said portion of the retaining element, and wherein said portion of the retaining element is provided with at least one notch whose mouth lies on the outer periphery of the retaining element.

23. A scraper-chain conveyor comprising a plurality of channel sections joined together end-to-end, each of the channel sections having a pair of side walls joined together by a floor plate, each pair of adjacent side walls being interconnected by respective connection means, each connection means comprising an elongate member which is insertible into laterally-open recesses formed in two coupling elements welded to the associated pair of adjacent side walls, the laterally-open recesses defining an elongate aperture which is slightly longer than the coupling member so that the coupling member is received within the aperture with a predetermined amount of axial play, a retaining element being provided for substantially preventing axial movement of the coupling member within the aperture by substantially filling up the space available for said predetermined amount of axial play, wherein the retaining element is an annular disc made of corrosion-resistant, resiliently deformable material, said disc having an unbroken peripheral wall completely surrounding an internal aperture, and wherein that portion of the retaining element which is positioned at the mouth of the aperture is, at least partially, of reduced wall thickness when compared with the wall thickness of the remaining part of the retaining element, wherein the retaining element is provided with two rounded thickened wall portions which are positioned symmetrically at opposite ends of said portion of the retaining element, and wherein said portion of the retaining element is provided with at least one notch whose mouth lies on the outer periphery of the retaining element.

* * * * *